Oct. 12, 1971  S. W. GETTY  3,611,499
TIRE FORMING APPARATUS
Filed Sept. 24, 1968  3 Sheets-Sheet 1
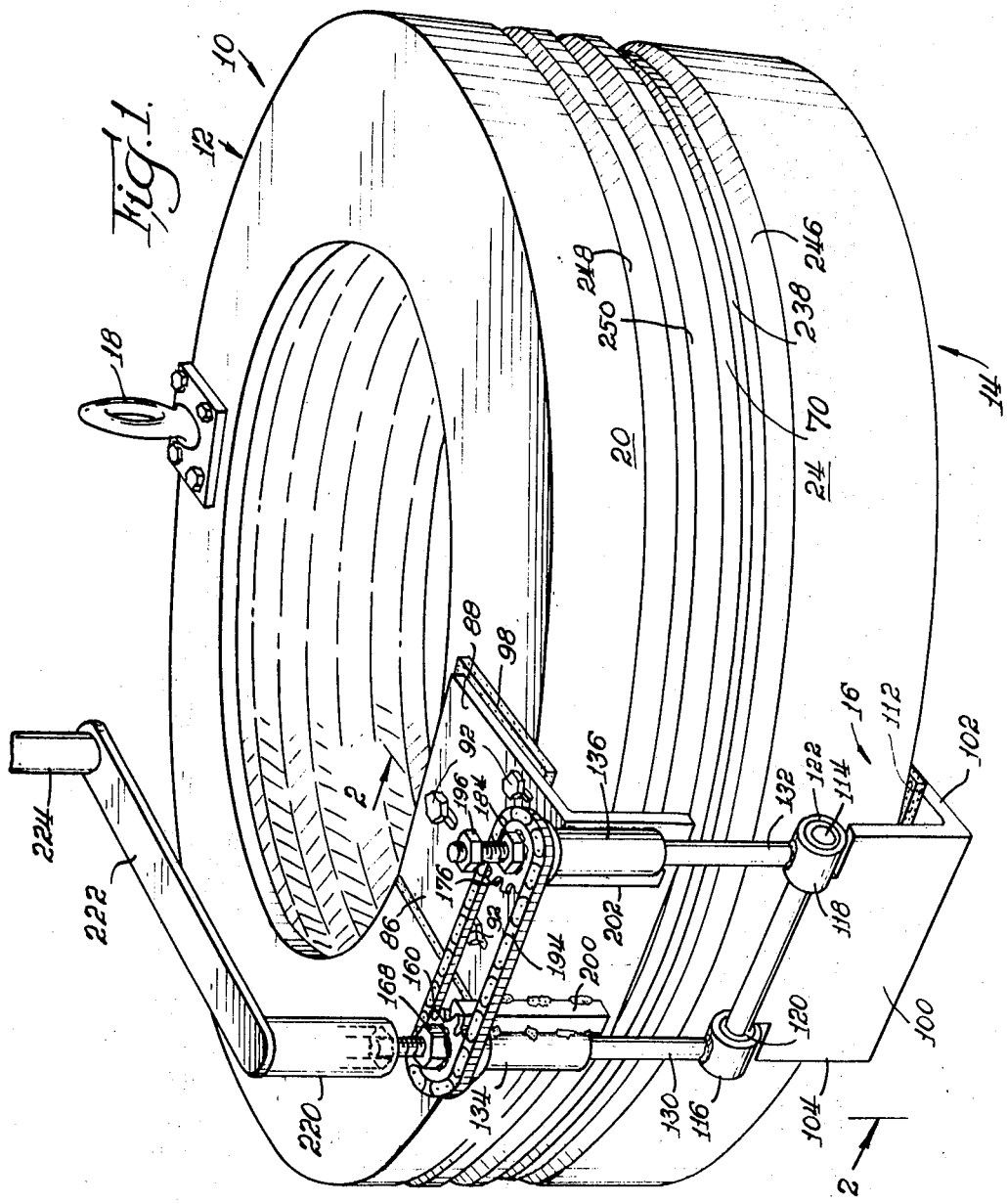
Inventor
Stewart W. Getty
By Brown, Jackson,
Boettcher & Dienner
Att'ys.

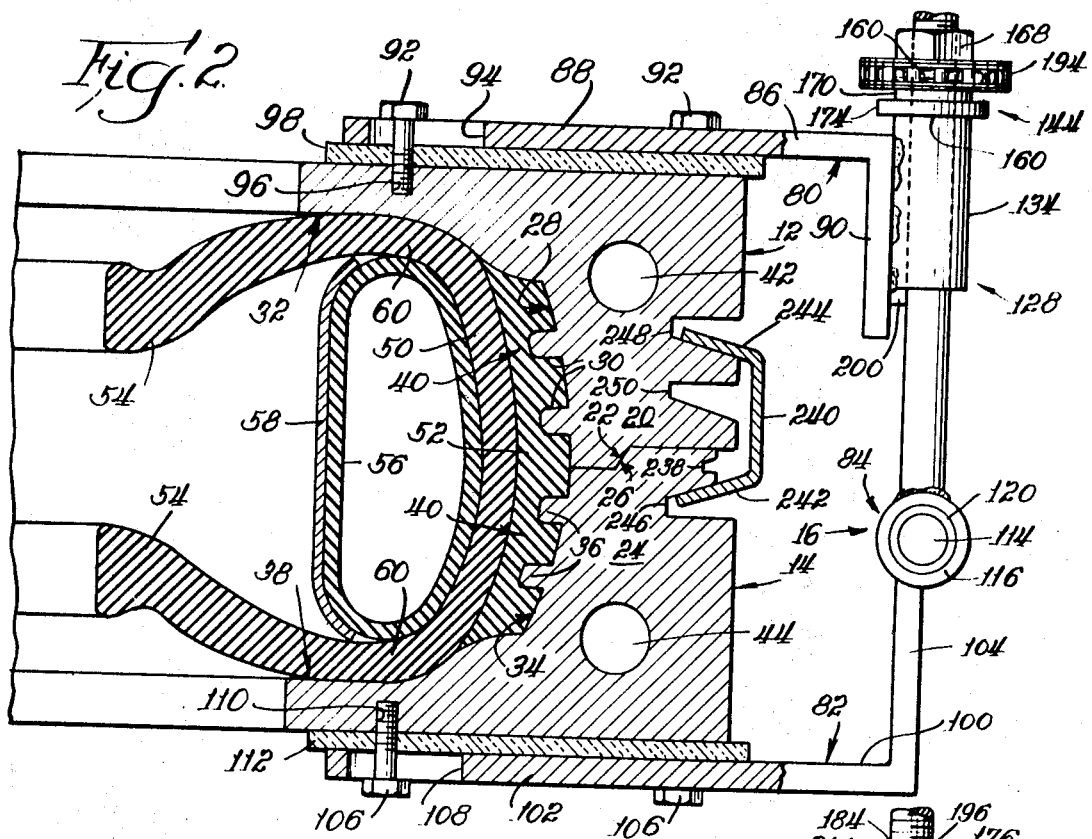
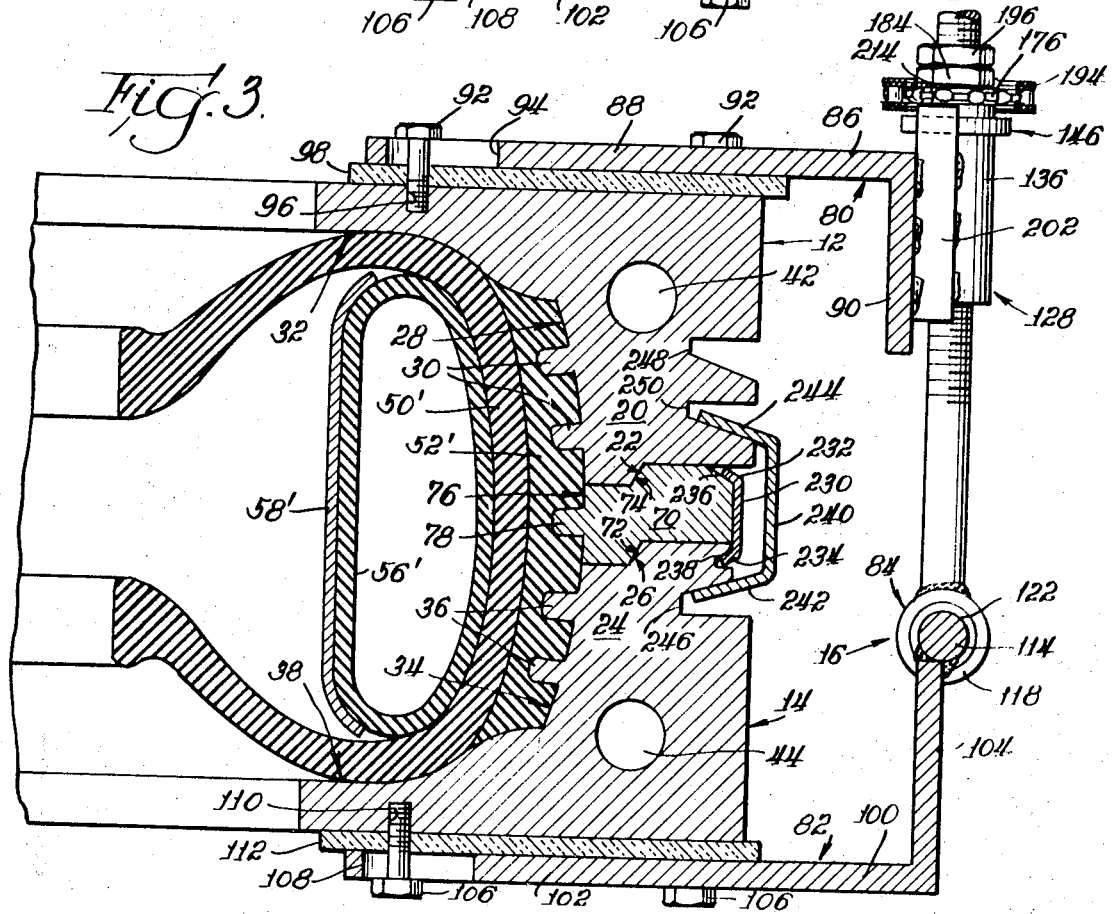

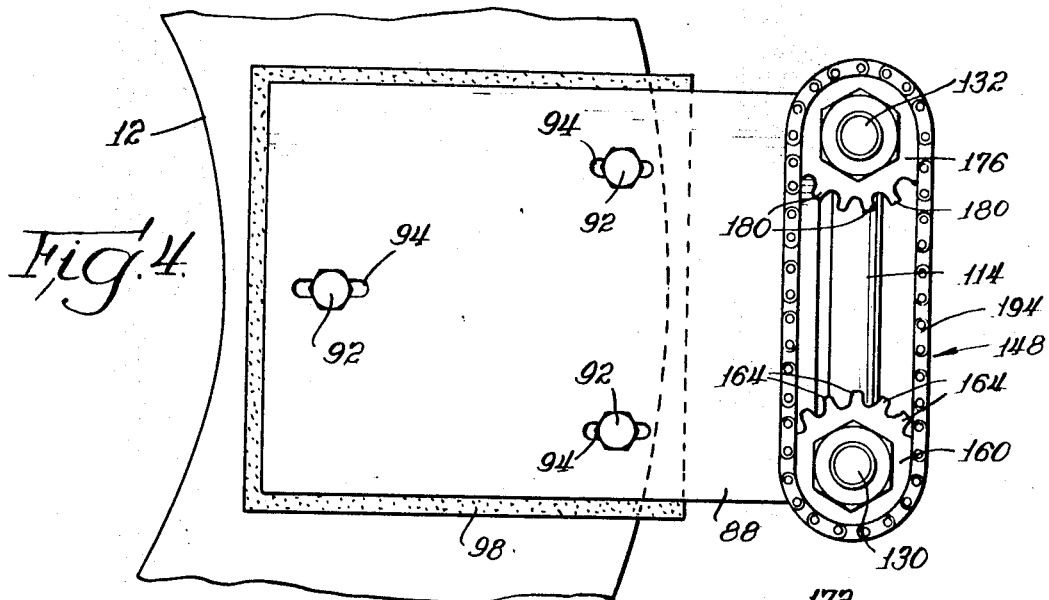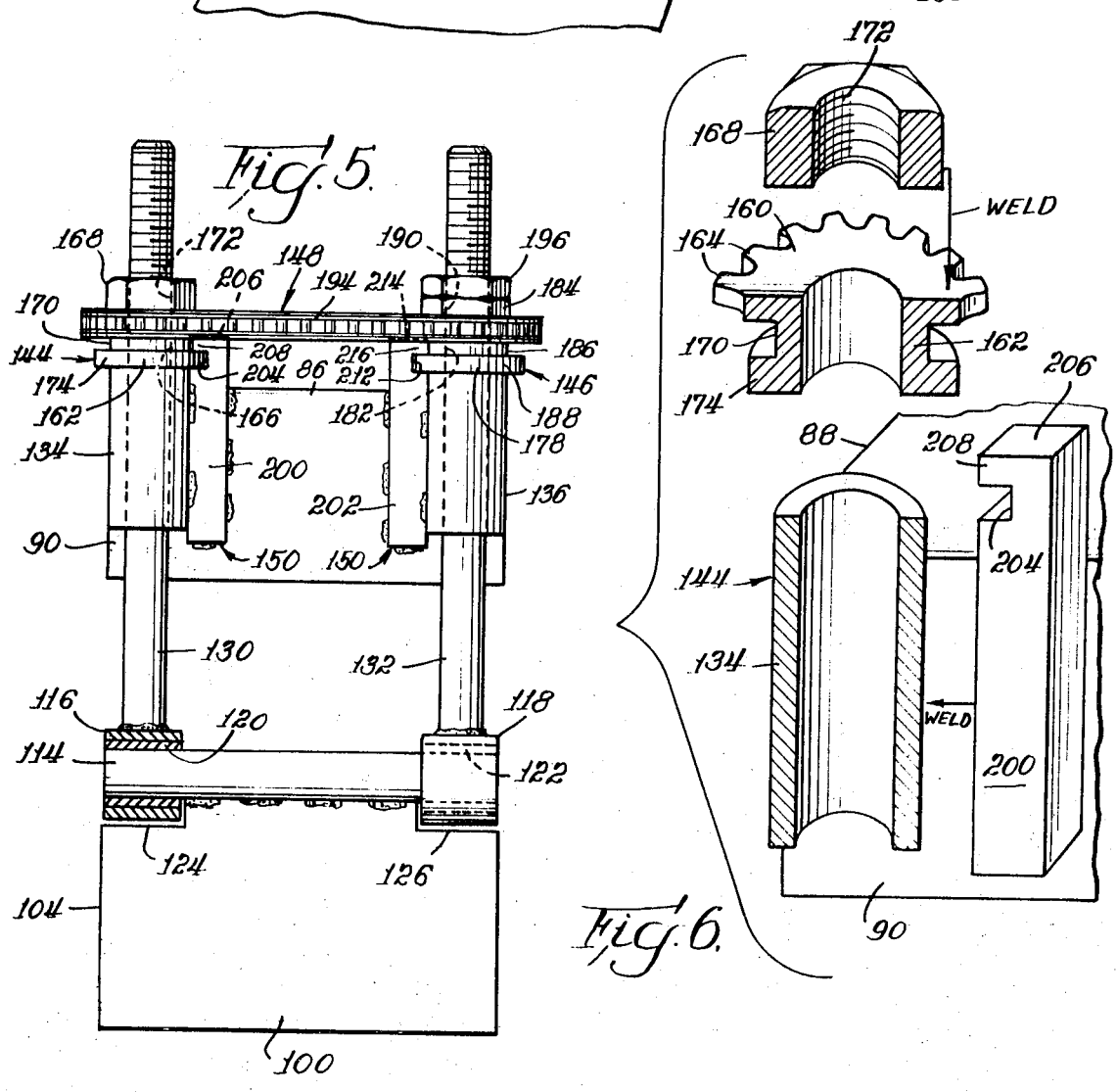

United States Patent Office 3,611,499
Patented Oct. 12, 1971

3,611,499
TIRE FORMING APPARATUS
Stewart W. Getty, Ocala, Fla., assignor to National-Standard Company, Niles, Mich.
Filed Sept. 24, 1968, Ser. No. 761,908
Int. Cl. B29h 5/02
U.S. Cl. 18—18 F
9 Claims

ABSTRACT OF THE DISCLOSURE

In tire forming apparatus of the type comprising two separable tire mold components, the construction of the hinge means permits adjustment of the relative spacing of the tire mold components for use either with or without a spacer of any practicable width and permits pivotal movement of one of the tire mold components with respect to the other, either with or without a spacer therebetween.

BACKGROUND OF THE INVENTION

In a commonly used method for retreading old tires, a method also useful for forming treads on new tires, a tire carcass to which uncured tread rubber has been suitably attached is inserted between two separable tire mold components. An inflatable bag is inserted within the tire carcass and inflated at high pressure to force the tread rubber outwardly into the tread-forming matrix defined by the tire mold components. Thereupon, the tire carcass and tread rubber are cured at a proper temperature for a predetermined time to form the finished tire.

The tire mold components are usually made of steel. Because of their size and weight, it is common to hinge them together and to use an overhead hoist or similar power unit to pivot one relative to the other. In this manner, the tire mold components may be separated to permit a tire to be inserted or withdrawn. In order that the tire mold components will not separate while a tire is being formed and cured, it is desirable to employ a detachable clamping band to clamp them together.

The tire mold components usually are quite expensive. For this reason, tire retreaders and other operators prefer to have a single set of tire mold components that are designed for treads of one width and to use a matching insert or spacer to adapt the same tire mold components for wider treads. Two basic tread widths are in common use, a "standard" tread width and a wider tread width. On occasion, other tread widths are called for. With a suitable spacer, a single set of tire mold components may be used in forming tire treads with a tread pattern of either basic width or of any other practicable width.

The provision of a spacer complicates the use of hinge means for hinging together the tire mold components. Conventionally, in order that the tire mold components may be used either with or without a particular spacer, one leaf of the hinge means is bolted or otherwise rigidly attached to one of the tire mold components in a fixed arrangement, and the other leaf of the hinge means is bolted to the other tire mold component in an adjustable arrangement. Typically, a bracket is rigidly attached to the latter tire mold component and detachable bolts are used to fasten the latter leaf to the bracket in either of two positions. Such a bracket has elongated slots or the like receiving the bolts. With the latter leaf fastened in one position, the tire mold components are used without the spacer, and, with the same hinge leaf portion fastened in the other position, the tire mold components are used with the spacer.

Hinge means of the foregoing type are clumsy. Adjustments are laborious and time consuming, requiring in each instance the repositioning of the detachable bolts. There is a need for new and improved hinge means permitting two tire mold components to be hinged together for use either with or without a spacer and reducing the labor and time required for installing and removing the spacer. Such a new and improved hinge arrangement would be particularly useful in a small tire-forming shop where only a few sets of tire mold components are available and where installation and removal of spacers are called for frequently, perhaps one or more times daily.

In an application of Vaughn Rawls, Ser. No. 713,942, filed Mar. 18, 1968, assigned to the assignee of the present application, there is disclosed hinge means between two separable tire mold components for defining a first hinge axis of pivotal movement of the tire mold components to opened and closed positions with respect to each other without a spacer therebetween and a second hinge axis of pivotal movement of the tire mold components to opened and closed positions with respect to each other with a spacer therebetween. Each given embodiment of the foregoing hinge means is limited in its utility to use with a spacer of a given width. There remains a need for new and improved hinge means, as mentioned, for use with spacers of varying widths.

SUMMARY OF THE INVENTION

It is the main object of this invention to provide improvements in tire forming apparatus of the type having two separable tire mold components, as discussed hereinbefore.

It is a more particular object of this invention to provide new and improved hinge means for hinging together two tire mold components so as to permit the hinged tire mold components to be used either with or without spacers therebetween.

It is another more particular object of this invention to provide hinge means, as described, eliminating much of the labor and time ordinarily required in installing and removing the spacers.

It is another object of this invention to provide hinge means, as described, for use with spacers of varying widths.

This invention has utility in tire forming apparatus of the aforementioned type having two separable tire mold halves or components adapted to receive tire carcasses with a tread portion of a given width. The hinge means of this invention hinges together the two mold components so as to permit selective adjustment of the relative spacing of the tire mold halves or components to permit spacers of varying widths to be fitted between the tire mold halves or components to adapt them to receive tire carcasses with wider tread portions. A spacer of any practicable width may be used as desired by the operator.

These and other objects, features and advantages of this invention will be evident from the following description, with the aid of the attached drawings, of a preferred embodiment of this invention.

BRIEF DESCRIPTION OF THE DRAWINGS

In the drawings:

FIG. 1 is a perspective view of tire forming apparatus embodying the principles of this invention;

FIG. 2 is a sectional view of the tire forming apparatus of FIG. 1, taken substantially along line 2—2 of FIG. 1, looking in the direction of the arrows;

FIG. 3 is a sectional view similar to FIG. 2, with a spacer interposed between the upper and lower tire mold halves or components of the tire forming apparatus;

FIG. 4 is in a top plan view of hinge means for hinging together the upper and lower tire mold halves or components of the tire forming apparatus;

FIG. 5 is a front elevational view of the hinge means;

FIG. 6 is an exploded perspective view, in longitudinal section, of certain elements of the hinge means; and FIG. 7 is a perspective view of another element of the hinge means.

DESCRIPTION OF THE PREFERRED EMBODIMENT

In FIG. 1, there is illustrated tire forming apparatus 10 which constitutes the presently preferred embodiment of this invention. The tire forming apparatus 10 comprises an upper tire mold half or component 12, a lower tire mold half or component 14, and hinge means 16 for hinging together the tire mold halves 12 and 14. The lower tire mold half 14 is supported in a horizontal position on a rigid base (not shown). The upper tire mold half 12 has an eye member 18 bolted thereto diametrically opposite the hinge means 16. The eye member 18 is adapted to receive a hook from a conventional overhead hoist (not shown) or the like.

As may be understood from FIGS. 1 and 2, the tire mold halves 12 and 14 may be closed together and abutted in mating relationship to define a complete tire mold or mold cavity. The abutting portion 20 of the upper tire mold half 12 is formed with a lateral offset 22, and the abutting portion 24 of the lower tire mold half 14 is formed with a mating lateral offset 26. The upper tire mold half 12 includes a matrix portion 28, from which project integral tread-forming elements 30, and a radially inwardly extending outer skirt portion 32. The matrix portion 28 defines one-half of a tread-forming matrix for tire tread of "standard" width. The lower tire mold half 14 includes a similar matrix portion 34, from which project similar integral tread-forming elements 36, and a similar radially inwardly extending skirt portion 38. The matrix portion 34 similarly defines one half of a tread-forming matrix for tire tread of "standard" width. Together, the tire mold halves 12 and 14 provide a tire-receiving matrix cavity 40, into which project the tread-forming elements 30 and 36. As is described in detail hereinafter, provision is made for clamping together the tire mold halves 12 and 14 around a tire carcass with a tread portion of "standard" width. In order that the tire forming apparatus 10 may be heated during the curing process, the upper tire mold half 12 is provided with internal conduit means 42, within which steam may be circulated in conventional manner, and the lower tire mold half 14 is provided with similar internal conduit means 44. Conventional means are provided for circulating steam through the conduit means 42 and 44. Details of such means may be supplied readily by those skilled in the art.

FIG. 1 shows a tire carcass 50, to which uncured tread rubber or camelback has been attached to form a tread portion 52 of "standard" width. In order that the tire carcass 50 may be received within the tire mold halves 12 and 14, as shown, the upper tire mold half 12 is pivoted up and away from the lower tire mold half 14. Conventional means (not shown) are used to either spread apart or draw together the beads 54 of the tire carcass 50 thereby to reduce the outer diameter of the tread portion 52. Details of such means may be supplied readily by those skilled in the art. The tire carcass 50 is placed upon or adjacent to the skirt portion 38 of the lower tire mold half 14, whereupon the upper tire mold half 12 is lowered and clamped to the lower tire mold half 14, and the beads 54 are released. Thereupon, an inflatable bag 56, which is backed by a suitably shaped stiff curing rim 58, is inflated within the tire carcass 50 to force the uncured tread rubber or camelback of the tread portion 52 upon the tread-forming elements 30 and 36 of the tread-forming matrix. Then steam may be circulated through the conduit means 42 and 44 to heat the uncured tread rubber or camelback of the tread portion 52 to the proper curing temperature. This temperature should be maintained for a predetermined time to form the finished tire. During the curing process, the curing rim 58 serves to confine the inflated bag 56 so as to force portions of the sidewalls 60 of the tire carcass 50 tightly against the skirt portions 32 and 38 thereby to contain the heated uncured tread rubber or camelback of the tread portion 52 within the tread-forming matrix.

As may be understood with the aid of FIG. 3, because of the construction of the hinge means 16, which is described in detail hereinafter, a spacer 70 of any practicable width may be interposed between the tire mold halves 12 and 14. The spacer 70 has a lower lateral offset 72, which mates with the lateral offset 26 on the lower tire mold half 14, and an upper lateral offset 74, which mates with the lateral offset 22 on the upper tire mold half 20. The spacer 70 includes a matrix portion 76, from which project integral tread-forming elements 78 similar to the earlier-described tread-forming elements 30 and 36. The matrix portion 76 and the matrix portions 28 and 34 together define a tread-forming matrix for wider tire tread.

FIG. 3 shows a tire carcass 50', to which uncured tread rubber or camelback has been attached to form a wider tread portion 52'. The tire carcass 50' has been placed within the tire mold halves 12 and 14 in the earlier-described manner. A wider inflatable bag 56', which is backed by a suitably shaped stiff curing rim 58' has been inflated within the tire carcass 50' to force the uncured tread rubber or camelback of the tread portion 52' upon the tread-forming elements 30, 36 and 78 of the tread-forming matrix. The tread portion 52' may be cured in the earlier-described manner to form the finished tire.

As shown in the drawings, the hinge means 16 generally comprises upper hinge leaf means 80 rigidly connected to the upper tire mold half 12, lower hinge leaf means 82 rigidly connected to the lower tire mold half 14, and pivot means 84 between the upper hinge leaf means 80 and the lower hinge leaf means 82 for defining an axis of pivotal movement of the tire mold halves 12 and 14 with respect to each other between open and closed positions.

The upper hinge leaf means 80 comprises a right-angled bracket 86 having a base portion 88 and a flange portion 90. The base portion 88 of the bracket 86 is bolted to the upper tire mold half 12 by means of a plurality of bolts 92 passing through respective elongated slots 94 in the base portion 88 of the bracket 86, and threadably engaging suitable threaded sockets 96 in the upper tire mold half 12. The elongated slots 94 in the base portion 88 of the bracket 86 are parallel and oriented so as to permit limited adjustment of the distance between the upper tire mold half 12 and the flange portion 90 of the bracket 86. A heat-insulative pad 98 may be positioned between the upper tire mold half 12 and the base portion 88 of the bracket 86 and held in place by the bolts 92.

The lower hinge leaf means 82 is similar to the upper hinge leaf means 80, except as mentioned hereinafter, and comprises a right-angled bracket 100 having a base portion 102 and a flange portion 104. The base portion 102 of the bracket 100 is bolted to the lower tire mold half 14 by means of a plurality of bolts 106, similar to the bolts 92, passing through respective elongated slots 108 in the base portion 102 of the bracket 100 and threadably engaging suitable threaded sockets 110 in the lower tire mold half 14. The elongated slots 108 in the base portion 102 of the bracket 100 are similar to the elongated slots 94 in the base portion 88 of the bracket 86, being parallel and similarly oriented. A heat-insulative pad 112, similar to the heat-insulative pad 98, may be positioned between the lower tire mold half 14 and the base portion 102 of the bracket 100 and held in place by the bolts 106. From FIGS. 2 and 3, it may be seen that the base portion 102 of the bracket 100 is slightly longer than the base portion 88 of the bracket 86. In other respects, the upper and lower hinge leaf means 80 and 82, respectively, are similar.

The aforementioned pivot means 84 comprises conventional pin and sleeve means arranged so as to define a pivot axis which is fixed in position with respect to the lower tire mold half 14. The pin means is journalled within the sleeve means. As shown, the pin means of the pivot means 84 comprises a single elongated pin member 114, and the sleeve means of the pivot means 84 comprises a pair of spaced coaxial sleeve members 116 and 118, respectively, rotatably fitted over sleeve bearings 120 and 122, respectively, at the opposite end portions of the pin member 114. The pin member 114 is welded or otherwise rigidly connected to the flange portion 104 of the bracket 100 of which the lower hinge means 82 is comprised, as is best shown in FIGS. 3 and 5. From FIG. 5, it may be seen that the corner portions 124 and 126, respectively, of the flange portion 104 of the bracket 100 are cut away to accommodate the sleeve members 116 and 118 at the opposite end portions of the pin member 114.

The hinge means 16 also generally comprises telescoping means 128 for providing a telescoping connection between the pivot means 84 and the bracket 86 of the upper hinge leaf means 80. Preferably, the telescoping means 128 comprises mutually telescoping shank means and guide means.

As shown, the shank means comprises an elongated at least partly threaded shank member 130, which is welded or otherwise rigidly connected to the sleeve member 116 in generally transverse relation thereto, and a similar elongated at least partly threaded shank member 132, which is rigidly connected to the sleeve member 118 in like manner. The shank members 130 and 132 may be of any desired practicable length. As shown, the guide means comprises a generally tubular guide member 134, which is slidably engaged with the shank member 130 for telescoping movement with respect to shank member 130, and a similar generally tubular guide member 136, which is slidably engaged with the shank member 132 for telescoping movement with respect to the shank member 132. The guide member 134 is welded or otherwise rigidly connected to the flange portion 90 of the bracket 86, and the guide member 136 is rigidly connected to the same flange portion 90 in like manner and in parallel relationship to the guide member 134.

An internally threaded collar 144 is threadably engaged with the shank member 130. An internally threaded collar 146, similar to the internally threaded collar 144, is threadably engaged with the shank member 132. The collars 144 and 146 are parts of the aforementioned telescoping means 128. Driving means 148 to be described hereinafter provide synchronous threading movement of the collars 144 and 146 along the respective shank members 130 and 132. Linking means 150 to be described hereinafter are provided for linking the generally tubular guide members 134 and 136 to the internally threaded collars 144 and 146, such that axial threading movement of the internally threaded collars 144 and 146 along the shank members 130 and 132 effects corresponding telescoping of the generally tubular guide members 134 and 136 with respect to the shank members 130 and 132.

The internally threaded collar 144 comprises a sprocket wheel 160, which has an elongated hub 162 and a set of radially extending circumferentially arranged sprocket teeth 164 integral with the elongated hub 142, and which has an enlarged axial bore 166 therethrough, in combination with a non-circular nut 168, preferably hexagonal as shown, which is welded or otherwise integrally attached to the sprocket wheel 160 adjacent the sprocket teeth 164 and coaxial with the elongated hub 162. An annular circumferential keyway 170 is provided in the elongated hub 162, defining an annular end portion 174 on the elongated hub 162. The threaded bore 172 of the nut 168 is threadably engaged with the shank member 130 such that the annular end portion 174 of hub 162 generally abuts the generally tubular guide member 134.

The internally threaded collar 146 similarly comprises a sprocket wheel 176, which has an elongated hub 178 and a set of radially extending circumferentially arranged sprocket teeth 180 integral with the elongated hub 178, and which has an enlarged axial bore 182 therethrough, in combination with a nut 184, which is welded or otherwise rigidly attached to the sprocket wheel 176 adjacent the sprocket teeth 180 and coaxial with the elongated hub 162. An annular circumferential keyway 186 is provided in the elongated hub 178, defining an annular end portion 188 on the elongated hub 178. As shown, the nut 184 is hexagonal. However, unlike the aforementioned nut 168, the nut 184 need not be non-circular. The threaded bore 190 of the nut 184 is threadably engaged with the shank member 132 such that the annular end portion 188 of the elongated hub 178 generally abuts the generally tubular guide member 136.

The aforementioned driving means 148 comprises a driving chain 194 wrapped around the sprocket wheels 160 and 176 and thereby arranged to drive the sprocket wheel 176 from the sprocket wheel 160.

Preferably, a lock nut 196 is threadably engaged with the shank member 132 so as to be threadable apart from and against the nut 184 of the internally threaded collar 146. The lock nut 196 may be used to fix the internally threaded collar 146 in a desired position along the shank member 132. Owing to the interconnection of the sprocket wheels 160 and 176 through the driving chain 194, the position of the internally threaded collar 144 along the shank member 130 is fixed when the position of the internally threaded collar 146 along the shank member 132 is fixed.

The aforementioned linking means 150 comprises an elongated keeper member 200, associated with the internally threaded collar 144, and a keeper member 202, similar to the keeper member 200, associated with the internally threaded collar 146.

The keeper member 200 has a lateral slot 204 therein near one end 206 thereof, defining a laterally projecting key 208 between the slot 204 and the near end 206. The keeper member 200 is associated with the internally threaded collar 144 such that the key 208 is keyed into the annular circumferential keyway 170 in the elongated hub 162 and such that the annular end portion 174 of the elongated hub 162 is keyed into the slot 204 in the keeper member 200. The keeper member 200 is welded or otherwise rigidly attached to the flange portion 90 of the bracket 86 alongside the generally tubular guide member 134 and may be welded or otherwise rigidly attached to the generally tubular guide member 134 for added rigidity.

The keeper member 202 similarly has a lateral slot 212 therein near one end 214 thereof, defining a laterally projecting key 216 between the slot 212 and the near end 214. The keeper member 202 is associated with the internally threaded collar 146 such that the key 216 is keyed into the annular circumferential keyway 186 in the elongated hub 178 and such that the annular end portion 188 of the elongated hub 178 is keyed into the slot 212 in the keeper member 202. The keeper member 202 is welded or otherwise rigidly attached to the flange portion 104 of the bracket 100 alongside the generally tubular guide member 136 and may be welded or otherwise rigidly attached to the generally tubular guide member 136 for added rigidity.

Owing to the association of the keeper members 200 and 202 with the internally threaded collars 144 and 146, axial threading movement of the internally threaded collars 144 and 146 along the shank members 130 and 132 effects corresponding telescoping movement of the generally tubular guide members 134 and 136 with respect to the shank members 130 and 132 thereby to push apart or pull together the bracket 86 of the upper hinge leaf means 80 and the bracket 100 of the lower hinge leaf means 82. This arrangement permits the upper tire mold half 12 and the lower tire mold half 14 to be used either without a spacer (FIG. 2) or with a spacer 70 of any practicable width (FIG. 3).

In adjusting the spacing of the bracket 86 of the upper hinge leaf means 80 and the bracket 100 of the lower hinge leaf means 82 for the purposes mentioned, a socket wrench 220 (FIG. 1) having an elongated arm 222 and a handle 224 may be used. Initially the lock nut 196 is loosened, as in FIG. 1. Then, the nut 168 of the internally threaded collar 144 is turned to effect axial threading movement of the internally threaded collars 144 and 146 along the shank members 130 and 132 in either direction as required. When the desired spacing of the bracket 86 of the upper hinge leaf means 80 and the bracket 100 of the lower hinge leaf means 82 has been achieved, the lock nut 196 should be tightened against the nut 184 of the internally threaded collar 146.

From the foregoing, it should be evident that the hinge means 16 for hinging together the tire mold halves 12 and 14 may be adjusted to accommodate a spacer 70 of any practicable size within the limits of the shank members 130 and 132.

As may be seen in FIG. 3, a small detachable clamping band 230 is used to clamp the spacer 70 to the lower tire mold half 14. The width of the clamping band 230 depends upon the width of the spacer 70. The clamping band 230 is provided with two marginal flanges 232 and 234. The upper outer edge 236 of the spacer 70 is beveled to receive the marginal flange 232. The lower tire mold half 14 has a peripheral groove 238 adapted to receive the marginal flange 234. Conventional means, for example a trunk latch (not shown), may be used to attach and detach the band 230.

As may be seen in FIGS. 2 and 3, a detachable clamping band 240 is used to clamp the upper tire mold half 12 to the lower tire mold half 14. The width of the clamping band 240 also depends upon the width of the spacer 70. The clamping band 240 is provided with two marginal flanges 242 and 244. The lower tire mold half 14 has a peripheral groove 246 adapted to receive the marginal flange 242. The upper tire mold half 12 has an upper peripheral groove 248 adapted to receive the marginal flange 244 when the spacer 70 is not interposed between the tire mold halves 12 and 14, and a lower peripheral groove 250 adapted to receive the marginal flange 244 when the spacer 70 is interposed between the tire mold halves 12 and 14; compare FIGS. 2 and 3. Conventional means, for example a trunk latch (not shown), may be used to attach and detach the band 240.

Although a preferred embodiment of the invention has been described in detail it will be understood that numerous changes in the details of construction and in the combination and arrangement of parts may be resorted to without departing from the spirit and scope of the invention.

The invention claimed is:

1. In tire forming apparatus of the type having two separable tire mold components adapted to receive a tire carcass with a tread portion of a given width, hinge means for hinging together the tire mold components so as to permit selective adjustment of the relative spacing of the tire mold components to permit spacers of varying widths to be fitted between the tire mold components to adapt the tire mold components to receive tire carcasses with wider tread portions, said hinge means comprising, in combination, pivot means between the tire mold components for defining a fixed axis of pivotal movement of the tire mold components with respect to each other between open and closed positions, telescoping means for providing an adjustable telescoping connection between said pivot means and one of the tire mold components for adjusting the relative spacing of the tire mold components with respect to each other, said hinge means comprising hinge leaf means rigidly connected to each of the tire molds, said pivot means comprising sleeve means and pin means journalled in said sleeve means, said telescoping means providing an adjustable telescoping connection between one of said pin and sleeve means and one of said hinge leaf means, the other of said pin and sleeve means being rigidly connected to the other of said hinge leaf means, and wherein said telescoping means comprises elongated threaded shank means rigidly connected to said one of said pin and sleeve means in generally transverse relationship to the axis of said pin and sleeve means, guide means slidably engaged with said shank means for telescoping movement with respect to said shank means and rigidly connected to said one of said hinge leaf means, internally threaded collar means threadably engaged with said shank means for axial threading movement along said shank means, and linking means for linking said guide means to said collar means such that axial threading movement of said collar means along said shank means effects corresponding telescoping movement of said guide means with respect to said shank means.

2. The hinge means of claim 1 wherein said pin means comprises a single elongated pin rigidly connected to said other of said hinge leaf means, and wherein said sleeve means comprises a pair of spaced coaxial sleeve members respectively fitted around spaced portions of said pin member.

3. The combination of claim 2 wherein said shank means comprises a pair of elongated threaded shank members each rigidly connected to a respective one of said sleeve members, and wherein said guide means comprises a pair of tubular guide members each slidably engaged with a respective one of said shank members for telescoping movement with respect to said respective shank members and rigidly connected to said one of said hinge leaf means.

4. The combination of claim 3 wherein said collar means comprises a pair of internally threaded collars each threadably engaged with a respective one of said shank members, and wherein said hinge means further comprises driving means for driving one of said collars from the other of said collars so as to provide synchronous threading movement of said collars along said respective shank members.

5. The combination of claim 4 wherein each of said collars comprises a set of radially extending circumferentially arranged integral sprocket teeth, wherein said driving means comprises a driving chain arranged to drive one of said sets of sprocket teeth from the other of said set of sprocket teeth.

6. The combination of claim 5 wherein one of said collars has a non-cylindrical end portion.

7. The combination of claim 4 wherein each of said collars has a circumferential keyway formed therein, and wherein said linking means comprises a pair of keeper members each being rigidly connected to one of said guide members and having a key portion keyed into one of said keyways.

8. The combination of claim 7 wherein each of said collars comprises a set of radially extending integral sprocket teeth, wherein said driving means comprises a driving chain arranged to drive one of said set of sprocket teeth from the other of said sets of sprocket teeth.

9

9. The combination of claim 8 wherein one of said collars has a non-cylindrical end portion.

References Cited

UNITED STATES PATENTS

| | | | |
|---|---|---|---|
| 3,438,090 | 4/1969 | Dennis | 18—18 (F) |
| 3,516,121 | 6/1970 | Mattox et al. | 18—2 (TT) X |
| 3,520,025 | 7/1970 | Mac Millan | 18—2 (TT) X |
| 26,266 | 11/1859 | Gray | 269—222 X |
| 456,568 | 7/1891 | Hesser | 269—222 |
| 732,013 | 6/1903 | Smith | 269—222 |
| 3,161,911 | 12/1964 | Mathews | 18—17 (W) X |
| 3,526,930 | 9/1970 | Rawls | 18—18 (F) |

J. SPENCER OVERHOLSER, Primary Examiner

J. E. ROETHEL, Assistant Examiner

U.S. Cl. X.R.

18—2 TT, 17 T